May 15, 1928.

V. V. MESSER 1,669,623

SLUG CUTTING MACHINE FOR PLASTIC MATERIAL

Filed April 5, 1924      6 Sheets-Sheet 1

INVENTOR
Vladimir V. Messer.
BY
ATTORNEY

FIG. 6.

May 15, 1928. 1,669,623
V. V. MESSER
SLUG CUTTING MACHINE FOR PLASTIC MATERIAL
Filed April 5, 1924 6 Sheets-Sheet 5

INVENTOR
VLADIMIR V. MESSER.
BY
ATTORNEY

Patented May 15, 1928.

1,669,623

UNITED STATES PATENT OFFICE.

VLADIMIR VICTOR MESSER, OF DOUGLASTON, NEW YORK, ASSIGNOR TO THE GOOD-YEAR TIRE & RUBBER COMPANY, OF AKRON, OHIO, A CORPORATION OF OHIO.

SLUG-CUTTING MACHINE FOR PLASTIC MATERIAL.

Application filed April 5, 1924. Serial No. 704,442.

My invention relates to stamping machines for stamping slugs of uniform volume from sheets of plastic material and it particularly relates to machines for cutting slugs from sheets of uncured rubber for use in the manufacture of molded rubber heels.

It has heretofore been customary to cut rubber slugs for use in the manufacture of rubber heels from sheets of plastic rubber by means of a die that was manually held between two relatively movable platens. The die is usually of somewhat less area than the area of the heel to be formed from the slug and the punchings from such dies were afterwards sorted and trimmed to provide slugs of the desired volume or weight necessary to properly fill the mold cavity for rubber heels without an unreasonable excess of material that is difficult to handle in the molding of such small articles.

Gang dies have to my knowledge never before been commercially used in the manufacture of rubber heels because of the inherent variation in the thickness of the stock to be cut and also because the waste is much greater when a gang die is used than when rubber slugs are cut from the sheet material by the use of a manually operated tool. For these reasons, it has previously been more economical to manually stamp the rubber slugs from the sheet material than to use gang dies of the type used for stamping sheet material of uniform thickness.

One object of my invention is to produce a machine that will cut slugs of uniform volume from plastic sheet material of varying thickness.

Another object of my invention is to provide a gang die, having a single cutting tool, that is adapted to be adjusted to cut uniform slugs of different sizes from sheets of plastic material substantially without waste.

Additional objects and advantages to be derived from practicing my invention will be apparent from a perusal of the accompanying specification and the drawings in which.

In general, my machine consists of a pair of feed rolls 1 and 2 that are adapted to feed a length of plastic sheet material 3 between a movable platen 4, that carries an assembled cutting unit 5, and a stationary platen 6. The distance that the sheet material 3 is advanced with each operation of the cutting unit is controlled in accordance with the thickness of the material by a feed control mechanism 7 (Figs. 4 and 5) which is actuated by the movement of a gauge cam 8.

Figure 1:
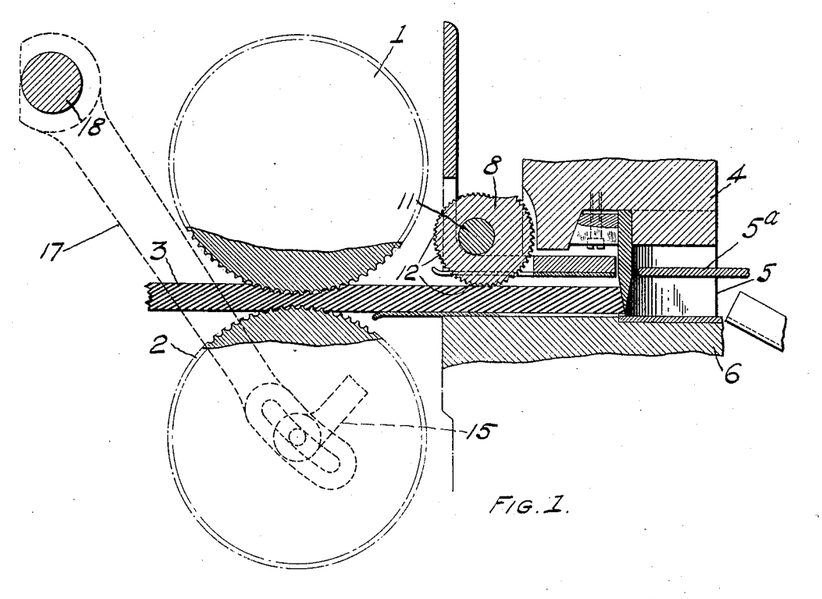
Fig. 1 is a vertical cross-sectional view of a machine constructed in accordance with my invention.
Figures 2, 3, 4, 5:
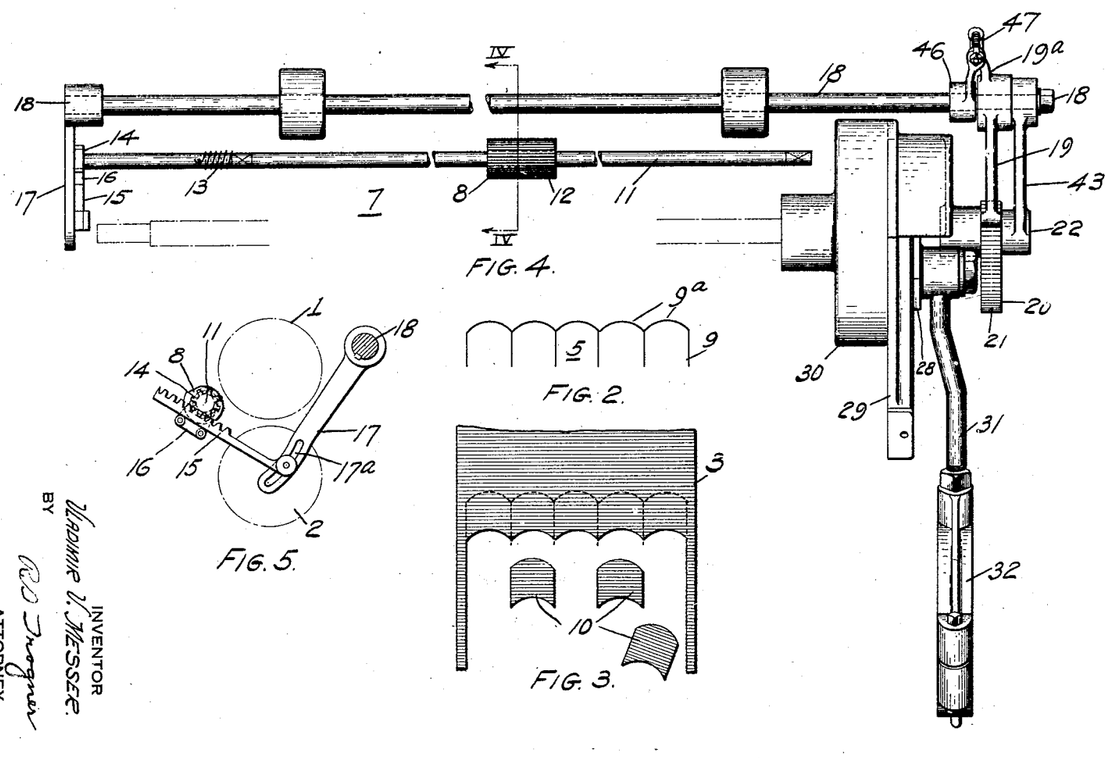
Fig. 2 is a diagrammatic plan view of the cutting edges of the tool secured to the top platen.
Fig. 3 shows a slab of material from which the heel slugs are being cut.
Fig. 4 is a front plan view, with parts broken away, of parts of the mechanism for automatically controlling the volume of material contained in the slugs cut from the sheet material.
Fig. 5 is a side elevational view looking in the right hand direction with respect to Fig. 4 of the mechanism shown in Fig. 4.

Referring particularly to the vertical sectional view of the machine shown in Fig. 1 of the drawings, the pair of feed rolls 1 and 2, each of which has a series of transverse and longitudinal grooves formed in its surface, engage the material and mechanically advance a definite length of material for each operation of the cutting tool 5, the cutting edge of which is shown diagrammatically in Fig. 2.

The cutting edge of the tool 5 has a series of substantially parallel cutting portions 9 that merge with a transverse cutting portion 9ª, thereby forming a cutting tool that has a series of parallel cutting edges that are adapted to longitudinally slit the material passed under the cutting tool. The cutting portions 9 terminate at one extremity into the transverse blade portion 9ª that is adapted to cut transversely across the slit portions and remove the slugs of the material advanced to the cutting edge.

Fig. 3 is a top plan view of a slab of uncured rubber compound, in which the position of the cutting tool 5 relative to the next cut to be made by the tool is shown in dotted outline. A view of the small slugs 10, that were severed from the slab 3 during the preceding cutting operation, are illustrated in this figure in order to show their shape and relation to the remaining slab of material 3. A series of stationary fingers 5ª remove the severed slugs from the die with each operation of the tool.

Figure 6:
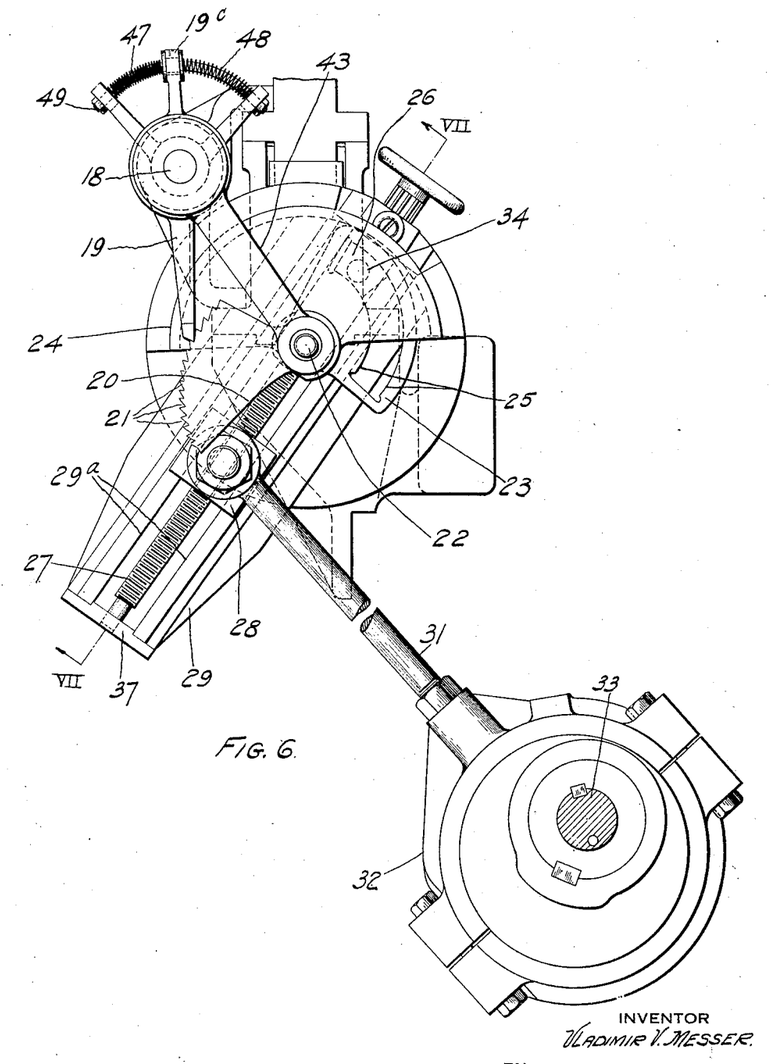
Fig. 6 is a side elevational view, with parts broken away, of additional parts of the material advancing control mechanism.
Figure 7:
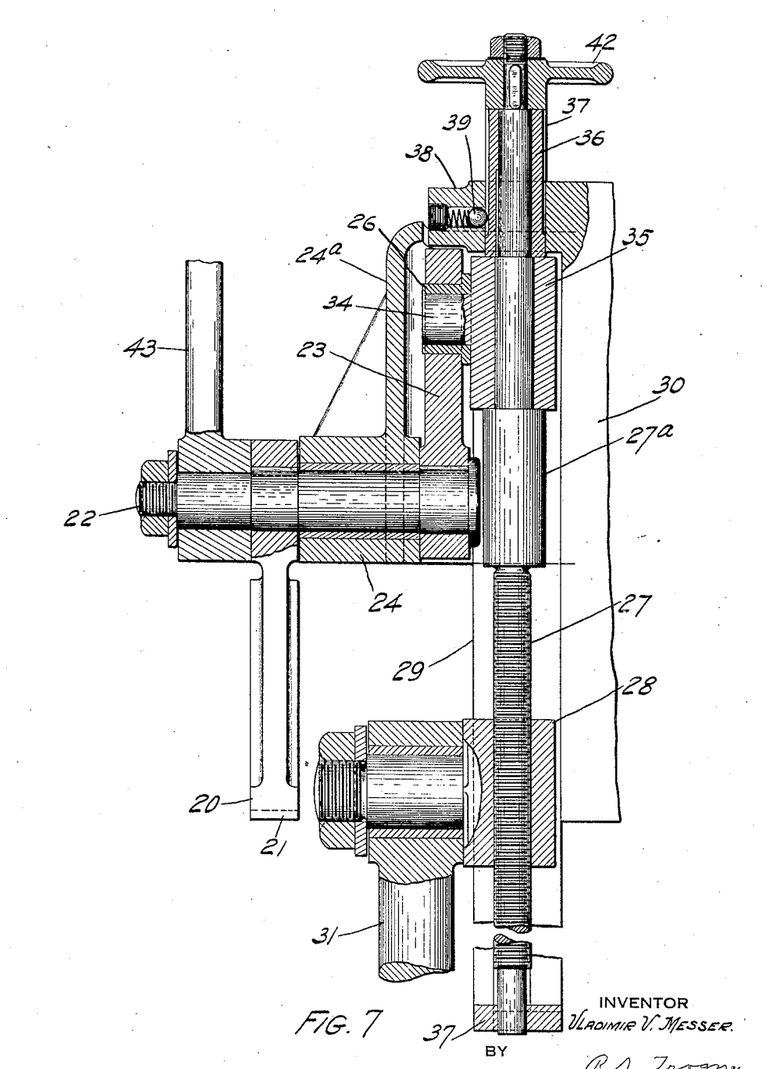
Fig. 7 is an enlarged vertical sectional view taken substantially on the axis VII—VII of an adjusting screw of the material advancing control mechanism shown in Fig. 6.

It will readily be understood that the longitudinal dimension of the slugs 10, that are cut from the sheet material, may be controlled by changing the distance which the slab 3 of rubber is advanced for each operation of the cutting knives. Fig. 6 illustrates the mechanism by means of which the distance that the slab of rubber is advanced with each cutting operation is manually controlled and Figs. 4, 5 and 7 illustrate parts of a mechanism that operates in conjunction with the feed controlling mechanism shown in Fig. 6 to automatically modify the distance that the material is advanced inversely in accordance with the thickness of the material in order to produce slugs 10 of uniform volume and weight. Supplemental manual control of the adjusting mechanism provides means for greatly changing the size of the slug and the automatic adjusting control will, after such adjustment of size has been made, accurately control the volume of the slug discharged from the machine.

The automatic control of the advancing mechanism is accomplished by a gauge cam 8, most clearly illustrated in Figs. 1 and 4, that is mounted on a cam shaft 11, and that is caused to rotate by the engagement of a series of its teeth 12 with the surface of the slab material 3 passing under the gauge cam. A helical spring 13 urges the cam against the direction of movement of the rubber slab, thereby maintaining it in continuous contact with the surface of the rubber slab and automatically controlling its movement in accordance with the thickness or gauge of the material 3 passing under it. In other words, if very thick material passes under the gauge cam, the engagement of the teeth of the cam with the surface of the material will tend to rotate the cam against the action of the spring 13 in a counter-clockwise direction, whereas if thinner gauge of material passes under the cam the spring 13 will rotate the cam in a clockwise direction until the engagement of the cam teeth 12 with the surface of the slab material 3 prevents further rotational movement of the cam.

A pinion 14 is mounted on one end of the cam shaft 11. The pinion is held in engagement with a rack 15 by a swinging support 16 of conventional form that is pivotally mounted on the cam shaft. The outer end of the rack arm 15 is pivotally secured to a cam feed adjustment arm 17 that has an arcuate slot 17ª formed therein for adjustment of the degree of movement of the gauge cam to correspond with the degree of movement that is to be transmitted to a feed controlling shaft 18 on the end of which the arm 17 is rigidly mounted.

In order to simplify the mechanical arrangement of the remainder of the machine, the remainder of the feed control mechanism is mounted on the other side of the machine and arranged to be actuated by the movement of the feed control shaft 18.

A pawl 19 is pivotally mounted on the end of the shaft 18 as particularly illustrated in Figs. 4 and 6. The pawl 19 is held in fixed relation with respect to the feed control shaft 18 by means of a collar 46 that is rigidly mounted on the shaft and a pair of helical springs 47 and 48 that are mounted on an arcuate bolt 49 that extends through the springs and, also through an eye in the upper end of an arm 19ª that extends upwardly from the pawl 19. The two springs 47 and 48, one of which governs the movement of the pawl 19, in each direction serve to prevent binding of the mechanical parts operated by the gauge cam 8 when the pawl 19 is held in fixed relation with respect to the teeth formed on the face of the cam 20.

The feed cam 20, that has a series of teeth 21 formed on its cam surface, is rigidly mounted on one end of a stud 22, the other end of which has a cam 23 rigidly mounted thereon and actuated in accordance with the movement of the cam 20. The stud 22 is rotatably mounted in a bearing 24 that is concentric with respect to the bottom feed roll 2. The cam 23 has a cam slot 25 that is adapted to receive a cam block 26 that controls the longitudinal movement of the feed screw 27.

A feed adjusting nut 28 is slidably mounted between the guides 29ª of a rocker arm 29 that is mounted on the housing of a ratchet mechanism 30 and adapted to move with the housing concentrically with respect to the feed roll 2 that is driven by the ratchet mechanism.

A rocker arm operating nut 28 is slidably mounted between the guide members 29ª of the rocker arm which is rigidly connected to the oscillatable housing of a ratchet device 30 which advances the feed roll 2 a predetermined distance every time the rocker arm 29 is actuated.

The rocker arm 29 is operated by an eccentric connecting rod 31 that pivotally receives the operating nut 28 at its upper end and that is operated from the main shaft 33 of the machine through an eccentric 32.

Since the drive shaft 33 also controls the operation of the cutting die, the feed roll is advanced a predetermined distance for every operation of the cutting die.

The feed screw 27 is rotatably mounted in the rocker arm 29 that actuates the lower feed roll 2 through the ratchet mechanism 30 in such manner that the oscillation of the rocker arm 29 drives the feed roll forward a distance that is determined by the position of the rocker arm operating nut 28 on the feed screw 27.

The cam block 26, the sides of which are of arcuate form to correspond with the cam slot 25, is pivotally mounted on a lug 34 that is formed intregally with a sleeve 35 that is mounted for longitudinal movement between the guide members 29ª of the rocker arm. The feed screw 27 turns freely in the sleeve 35 but longitudinal movement of the feed screw in the sleeve is prevented by an enlarged portion 27ª of the feed screw and a splined sleeve 36.

The feed screw 27 is rotatably mounted at its lower end in a bearing 37 that permits both rotational and longitudinal movement of the screw, and also in an upper bearing block 38 that permits limited rotational and free longitudinal movement of the screw. The latter bearing block has a ball lock 39 that is held in engagement with a series of splines 36ª that are formed in the sleeve 36. The sleeve 36 is rigidly secured to the upper end of the screw shaft. The engagement of the ball lock 39 with the splined sleeve 36 prevents rotational movement of the feed screw 27 except when the screw is operated by the hand adjusting wheel 42 without materially restricting the longitudinal movement of the screw.

The feed screw 27 also has an enlarged central portion 27ª that provides a shoulder against which the sleeve 35 abuts to prevent longitudinal movement of the sleeve relative to the screw. The splined sleeve 36 is keyed against rotational movement with respect to the feed screw and provides a shoulder that maintains the sleeve 35 in fixed longitudinal position on the screw shaft.

A link 43 is pivotally mounted on the shaft 18 at its upper end and also has a bearing support at its lower end for the stud 22. This link insures definite movement of the cam 20 when engaged by the pawl 19 and prevents springing the shaft 18 by operation of the pawl.

From the above description of the mechanical parts, associated with this automatic control of the advance of material inversely in accordance with the thickness of the material fed between the feed rolls 1 and 2, it will be seen that, if the rocker arm operating nut 28 is manually adjusted to normal position for the particular size of slug that is to be cut from the slab material 3, any increase in the thickness of the material will rotate the gage cam 8 in counter-clockwise direction which will move the pawl 19 inwardly with respect to the pivot stud 22 of the automatic feed mechanism, thereby engaging the cam face 20 near the upper end of the cam when the connecting rod 31 starts its upward movement. When the pawl engages the cam 20, it locks the cam in the engaged position and the relative movement of the rocker arm with respect to the cam 20 causes the cam block 26 to travel in the eccentric cam slot 25 and to thereby move the sleeve 35 along the guides 29ª longitudinally of the rocker arm 29 and to carry with it the feed screw 27. The longitudinal movement of the screw 27 of the rocker arm operating nut 28 changes the amplitude of the swing of the rocker arm 29.

After adjustment of the normal size of slug is made with the hand wheel, the amplitude of the oscillatory movement of the rocker arm 29 is automatically modified inversely in accordance with the thickness of the material and, since the rocker arm is concentrically mounted with respect to the feed roll 2 and drives the feed roll through the ratchet mechanism 30, the advance of the material by the feed rolls 1 and 2 will be automaticaly controlled relative to the particular size of slug for which the machine is set, inversely in accordance with the thickness of the material passing under the gauge cam 8.

It will, therefore, be understood that since the slugs 10, that are formed by the operation of the cutting tool 5, are of fixed dimension with respect to their width and, since the longitudinal dimension of the slug is determined by the degree of the advance of the sheet of material for the corresponding operating stroke, the cubical content of the slug will be maintained constant regardless of variations in the thickness of the slab 3 of material from which the slugs are cut.

The remaining figures of the drawings show a form of my invention that avoids the necessity of modifying the advance of the material inversely in accordance with its thickness in order to obtain slugs of uniform volume. In the modified form of my invention I employ a presser foot that reduces the thickness of the slab of material from which the slugs are being cut to a uniform gauge and, by cutting the material on each side of the presser foot, slugs of substantially uniform volumes are produced.

Figure 8:
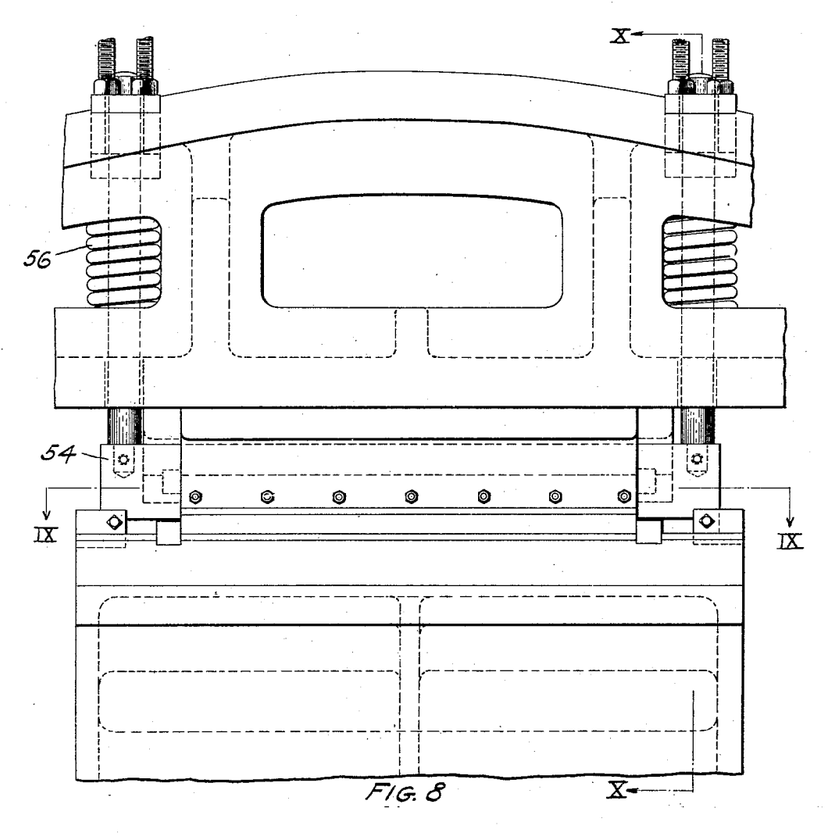
Fig. 8 is a front elevational view of a machine embodying a modified form of my invention.
Figure 9:
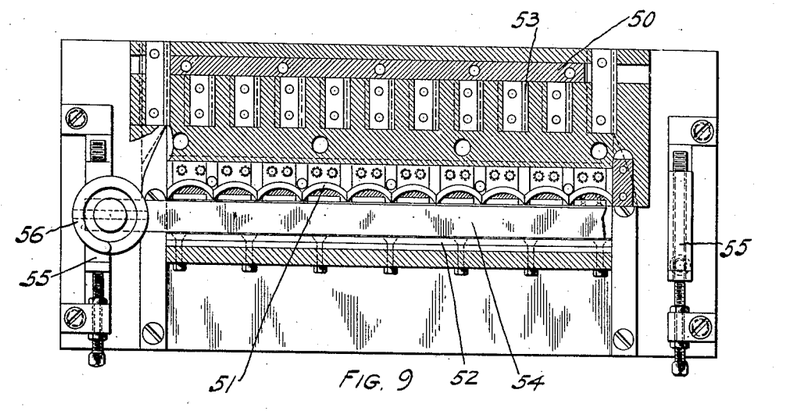
Fig. 9 is a vertical cross-sectional view, with parts broken away, of the machine shown in Fig. 8, taken substantially on lines IX—IX.
Figure 10:
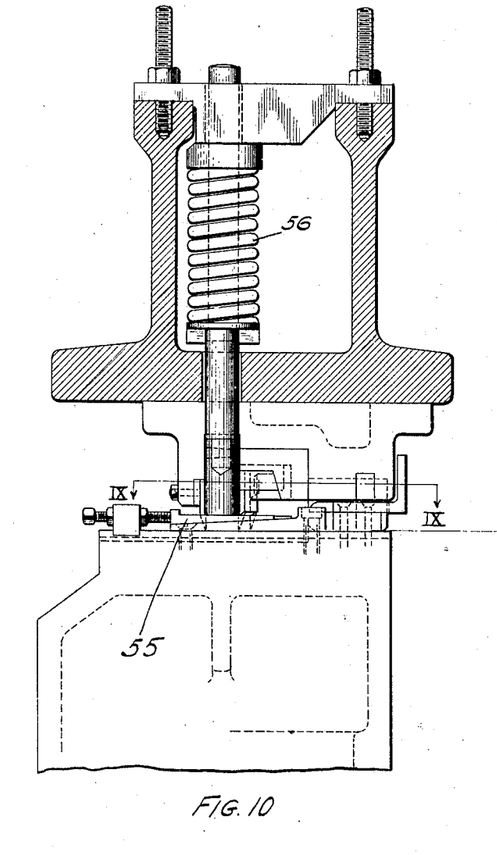
Fig. 10 is a horizontal cross-sectional view taken substantially on line X—X of Fig. 8, of a cutting tool used in a modified form of my invention.

Fig. 9 of the accompanying drawings is a cross-sectional view taken on lines IX—IX of Fig. 8 illustrating the relation of the cutting tool parts to a presser foot that reduces the material from which the slugs are being cut to a uniform gauge. The cutting tool 50 in this instance has a pair of lateral cutting elements 51 and 52 that are separated from but operate simultaneously with the series of parallel cutting elements 53 that cut slits longitudinally of the slab material at each operation of the press. The cutting element 51 is formed of a series of connected arched portions that correspond somewhat to the curvature of the back of the heel slugs that are to be formed from the material. The simultaneous operation of the straight cutting element 52 that is positioned on the other side of the presser foot 54 severs the trailing side of the slug from the slab material, the longitudinal cuts already having been completed by the preceding operation of the parallel cutting elements 53.

Since the presser foot 54 that is spaced a definite distance from the platen of the machine by a pair of adjustable blocks 55 is operated slightly in advance of the cutting elements, it compresses the slab of plastic material to the thickness of the spacer blocks 55 prior the cutting operation. Since the cutting elements 51 and 52 sever the material on each side of the presser foot, the slugs that are formed between the cutting elements 51 and 52 under the presser foot 54 are of predetermined thickness when the slug is severed from the slab and, therefore, they contain substantially the same volume of material in each instance because all of the dimensions of each of the slugs remain constant for every operation of the cutting die.

Figure 11:
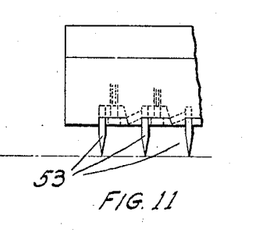
Fig. 11 is a detail in elevation of the cutting tool shown in Fig. 10.

Fig. 11 shows the relative position of the cutting elements 53 as viewed from the discharge side of the machine. The cutting elements 51, 52 and 53 are all simultaneous actuated by the top platen that also carries the presser foot 54 that compresses the slab stock by means of helical springs 56.

It will readily be seen that this machine embodies substantially all of the advantages of the preceding machine without incorporating the automatic advance controlling devices that are adapted to be used with the preceding form of my invention.

Although I have described only two applications of my invention, it is obvious that other modifications may be made and I desire, therefore, that only such limitations shall be imposed as are set forth in the spirit and scope of the appended claims.

What I claim is:

1. A machine for cutting plastic sheet material of varying gauge comprising a reciprocating cutting die, a cooperating platen, means for supplying sheet material to said die, and means actuated by the sheet material for controlling the quantity of material supplied to said die for each cycle of operation thereof.

2. A machine for cutting sheet material comprising a reciprocating cutting die, a cooperating platen, means for supplying a definite area of sheet material to said die for each cycle of operation thereof, means for manually changing the area of material normally supplied to said die, and means actuated by the thickness of the sheet material for modifying the area of material supplied to said die inversely in accordance with the thickness of said material.

3. A machine for cutting sheet material comprising a cutting die, means adapted to supply sheet material to said die, means adapted to advance a definite length of said material to said die for each cycle of operation thereof, means for manually adjusting the length of material thus supplied to said die for each operation, and means actuated by said sheet material for automatically modifying the length of material supplied to said die inversely in accordance with the cross-sectional area of said material.

4. The method of forming slugs of plastic material that consists in forming a series of parallel cuts that are joined by a transverse cut along one extremity of the parallel cuts, advancing the material a predetermined distance, and again forming a series of parallel cuts joined by a transverse cut intersecting with said parallel cuts, each cutting operation being adapted to form the leading face of a slug that is removed from the sheet material by the succeeding operation.

5. In a machine adapted to feed sheet material to a cutting die, a member in engagement with the sheet, a movable arm engaging the member, a link connected to the arm, and adjusting means connected to the link and to a driving mechanism for the sheet of the material operative upon variations in the thickness of the material to regulate the amount of material fed to the cutting die.

6. Control mechanism for a machine adapted to feed sheet material, comprising a gauge in contact with the sheet, a rocker arm connecting the gauge to a pawl, a cam cooperating with the pawl, a support for the cam, a link mounted on the support, and means associated with the link to vary the amount of feed upon actuation of the gauge.

7. In a machine for feeding sheet material, means engaging the sheet, a driving system associated with the engaging means, and means for controlling the effectiveness of the driving means, said means comprising an eccentric mounted on the driving means, and a kinematic system operative upon variations in the thickness of the sheet to alter the eccentricity of the controlling means.

8. In a machine for feeding sheet material of variable thickness, rollers engaging the sheet, driving means periodically actuating the rollers engaging the sheet, a gauge contacting with the sheet, a pawl connected to the gauge, a cam engaging the pawl and an eccentric cooperating with the cam and driving means automatically adjustable to alter the effective effort of the driving means upon actuation of the gauge.

In witness whereof, I have hereunto signed my name.

VLADIMIR VICTOR MESSER.